US006633305B1

(12) United States Patent
Sarfeld

(10) Patent No.: US 6,633,305 B1
(45) Date of Patent: Oct. 14, 2003

(54) SYSTEM AND METHOD FOR MAGNIFYING AND EDITING IMAGES

(75) Inventor: Edward W. Sarfeld, Ottawa (CA)

(73) Assignee: Corel Corporation (CA)

(*) Notice: Subject to any disclaimer, the term of this patent is extended or adjusted under 35 U.S.C. 154(b) by 249 days.

(21) Appl. No.: 09/596,267

(22) Filed: Jun. 16, 2000

(30) Foreign Application Priority Data

Jun. 5, 2000 (CA) .............................................. 2310945

(51) Int. Cl.⁷ ................................................. G09G 5/00
(52) U.S. Cl. ...................................... 345/671; 345/667
(58) Field of Search ................................ 345/660, 667, 345/671, 800; 382/133

(56) References Cited

U.S. PATENT DOCUMENTS

| 4,829,493 A | 5/1989 | Bailey ......................... 367/111 |
| 4,841,291 A | 6/1989 | Swix et al. .................. 345/473 |
| 4,873,676 A | 10/1989 | Bailey et al. ................. 367/98 |
| 4,988,984 A | 1/1991 | Gonzalez-Lopez .......... 345/660 |
| 5,027,110 A * | 6/1991 | Chang et al. ............... 345/668 |
| 5,187,776 A | 2/1993 | Yanker ........................ 345/800 |
| 5,276,787 A | 1/1994 | Searby ........................ 345/173 |
| 5,302,968 A | 4/1994 | Heberle ....................... 345/671 |
| 5,526,478 A | 6/1996 | Russell, Jr. et al. ......... 707/512 |
| 5,696,530 A | 12/1997 | Maejima ..................... 345/671 |
| 5,790,921 A | 8/1998 | Ishikura et al. .............. 399/86 |
| 5,880,709 A | 3/1999 | Itai et al. .................... 345/629 |
| 5,880,722 A | 3/1999 | Brewer et al. .............. 345/723 |
| 6,031,930 A * | 2/2000 | Bacus et al. ................ 382/133 |
| 6,084,598 A * | 7/2000 | Chekerylla .................. 345/427 |

* cited by examiner

Primary Examiner—Matthew C. Bella
Assistant Examiner—Anthony Blackman
(74) Attorney, Agent, or Firm—Hayes Soloway P.C.

(57) ABSTRACT

An image editing system uses a loupe cursor to magnify a selected area of a basic image displayed on a display device. The system generates basic image data representing the selected area of the basic image, and generates magnified image data by magnifying the selected basic image data. It displays within the loupe cursor a loupe image based on the magnified image data. When a user editing signal is received for editing the loupe image, the system generates modified image data, and dynamically modifies the loupe image displayed within the loupe cursor based on the modified image data.

31 Claims, 4 Drawing Sheets

SYSTEM AND METHOD FOR MAGNIFYING AND EDITING IMAGES

This invention relates to a system and method for magnifying and editing images, and more particularly, to a system and method for magnifying and editing images using a loupe cursor.

BACKGROUND OF THE INVENTION

Many graphic applications provide a mechanism for zooming or magnifying an area of an image displayed on a display screen. An example of a zooming mechanism is zooming an image while manipulating transparency masks. With such a zooming mechanism, the user is typically required to zoom the entire image while editing fine detail. This could result in that the user loses the relative position or entire view of the image upon which the user is acting.

In order to provide the user with an indication of the positional relation between the original image and an enlarged view, it is known to display an enlarged view of an area of the original image in a preselected area of the display screen together with the original image. Some existing zooming mechanisms provide an enlarged view superposed over the original image. The enlarged view acts as a view window. The enlarged image displayed in the view window corresponds to the placement of the cursor on the display screen. In this mechanism, the view window remains in a static position while the enlarged image is displayed within it.

U.S. Pat. No. 5,696,530 issued to Maejima on Dec. 9, 1997 discloses a method of moving an enlarged image with a mouse cursor. This method provides an area for displaying an enlarged display. The enlarged display is superposed over the original image and centred on a point of a whole image indicated by a mouse cursor. This method maintains the enlarged display while the cursor moves within the area for the enlarged display. Once the user moves the cursor outside of the area for the enlarged display, another enlargement is created. The enlarged display area is refreshed only after the cursor is moved outside of the area for displaying the enlarged display. Thus, each enlarged display is still a static display of the enlarged area. It does not allow dynamic editing of the enlarged display.

It is therefore desirable to provide an image magnifying system which allows dynamic editing of an enlarged or magnified image displayed over an original image.

SUMMARY OF THE INVENTION

The present invention uses a loupe cursor which dynamically displays a magnified image of a selected area of a basic image displayed on a display device, and that allows manipulation of the image.

In accordance with an aspect of the present invention, there is provided a loupe cursor controller for assisting a user to edit a basic image displayed on a display device. The loupe cursor controller comprises a user input interface, a selector, a magnifier, a modifier, a loupe image data generator and a display interface. The user input interface is provided for receiving a user select signal and a user editing signal. The selector generates selected basic image data representing an area of the basic image defined by the user select signal. The magnifier generates magnified image data by magnifying the selected basic image data. The modifier generates modified image data by modifying the magnified image data in response to the user editing signal. The loupe image data generator generates loupe image data based on the magnified image data and the modified image data. The display interface sends the loupe image data to the display device to display a loupe image based on the loupe image data over the basic image.

In accordance with another aspect of the invention, there is provided a method for editing a basic image displayed on a display device. The method comprising generating basic image data representing a selected area of the basic image using a loupe cursor having a predetermined area on the display device; generating magnified image data by magnifying the selected basic image data; displaying within the loupe cursor a loupe image based on the magnified image data; receiving a user editing signal for editing the loupe image; generating modified image data when the user editing signal is received; and dynamically modifying the loupe image displayed within the loupe cursor based on the modified image data.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
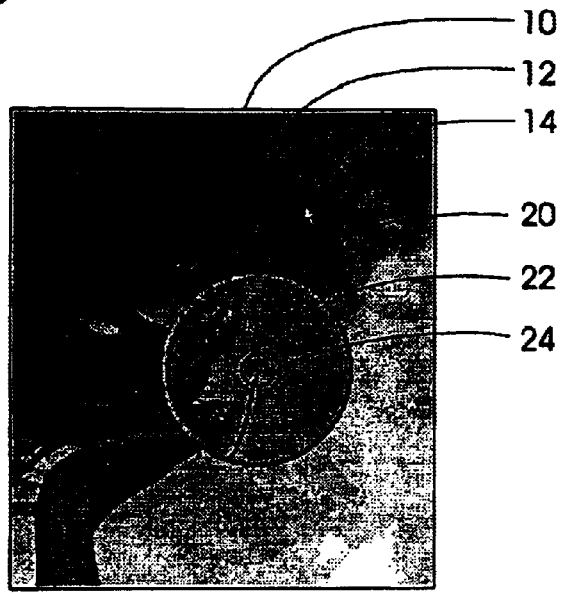
FIG. 1 is a displayed image showing an example of a loupe cursor in accordance with an embodiment of the present invention.

Referring to FIG. 1, a loupe cursor 20 in accordance with an embodiment of the present invention is described.

A base image 12 is displayed on a display screen 10. The base image 12 may be any bitmap image, for example, documents, figures, symbols and any combination thereof.

A conventional cursor, e.g., a mouse cursor 14, is provided for moving the loupe cursor 20 and editing the images within and outside the loupe cursor 20. In this embodiment, the mouse cursor 14 is provide together with the loupe cursor 20. In a different embodiment, the conventional cursor may turn into the loupe cursor when the loupe cursor is activated in a mobile mode, as described later. In such a different embodiment, if the user selects the loupe cursor in a fixed position mode, then the conventional cursor remains and coexists with the loupe cursor in order to allow the user a means of input for editing the image in the loupe cursor.

The loupe cursor 20 is used to increase the magnification of a selected area of the base image 12. The selected area of the base image 12 is the area underlying the loupe cursor 20.

The magnified image 22 is displayed in the area contained within the loupe cursor 20.

The loupe cursor 20 allows the user to actively manipulate the image contents of the loupe cursor 20 while in the magnified state, and work in a higher resolution environment without changing the display state of the entire base image 12. That is, the user does not need to zoom the entire base image 12. The user can work in finer detail in the loupe cursor 20 while maintaining the perspective of the entire base image 12.

The area magnified by the loupe cursor 20 is defined by magnifying factors including a shape, size and magnification of the loupe cursor 20.

The loupe cursor 20 may have any shape and size as long as it can be displayed superimposed over the base image 12 without unduly blocking the perspective of the entire base image 12. It may be circular as shown in FIG. 1. Typically, it is practical to set a circular loupe cursor to 25 pixels or 50 pixels in radius. It is preferable to provide a function by which the user can set or modify the size of the loupe cursor 20.

Figure 2:
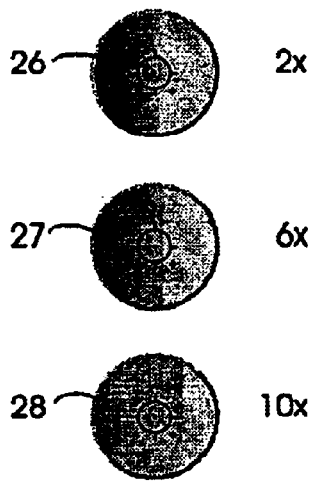
FIG. 2 is a diagram showing examples of magnifications of the loupe cursor shown in FIG. 1.

The magnification of the loupe cursor 20 may be selected depending on the purposes. It is also preferable to provide a function by which the user can set or modify the magnification of the loupe cursor 20. Typically, it is practical to allow the user to set a magnification factor to 2 times to 10 times. The magnified image is generated by multiplying the basic image by the magnification factor. FIG. 2 shows examples of 2 times, 6 times and 10 times of magnification in loupe cursors 26–28.

Figure 2A:
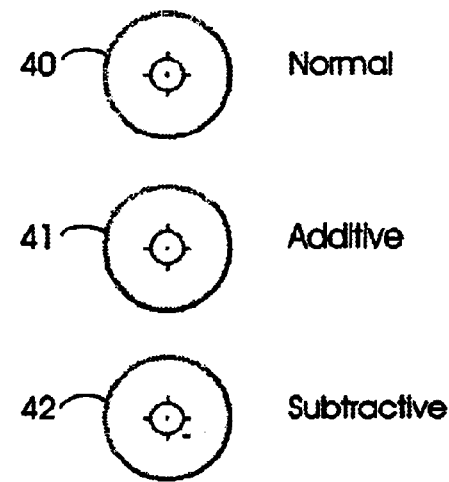
FIG. 2A is a diagram showing examples of loupe cursor.

Thus, the loupe cursor 20 allows magnification of the enlarged basic image while the user is masking. It desirably works for any mask tools including additive and subtractive masking modes. The loupe cursor 20 may indicate the masking modes. For example, FIG. 2A shows a normal loupe cursor 40, a loupe cursor 41 in an additive masking mode, and a loupe cursor 42 in a subtractive mode. The normal mode may not exist, and the loupe cursor 20 may be implemented in the additive mode by default and change to the subtractive mode using a control key.

The loupe cursor 20 may be stationary on the screen, or movable around the screen. When the loupe cursor 20 is stationary, the loupe cursor 20 may allow the user to edit the base image directly while viewing the regular cursor and base image in an enlarged state.

The loupe cursor 20 may be initiated prior to drawing a selection of an area to be magnified, or during a selection of the area and act simply as a toggle for the loupe cursor 20. The loupe cursor 20 serves as a zoom device until the user performs some specific actions, e.g., bringing mouse down to edit the image.

It is preferable that the loupe cursor 20 has a target indicator 24 indicating a target pixel or pixels (not shown) of the base image 12 upon which the loupe cursor 20 is acted. The target pixel or pixels define the area of the base image 12 to be magnified. For example, the area of the base image 20 may be defined such that a target pixel is at the centre of the area to be magnified. The dimensions of the area depend on the shape, size and magnification of the loupe cursor 20.

The target indicator 24 may be circular or cross-hair lines or any other shape or size suitable to indicate the target pixel or pixels.

The target indicator 24 may be provided at a fixed location relative to the loupe cursor 20, or may be movable independent from the loupe cursor 20. A fixed target indicator 24 may be provided at the centre of the loupe as shown in FIG. 1 or any other location within or outside the loupe cursor 20.

When the target indicator 24 is movable independent from the loupe cursor 20, the loupe cursor 20 may be fixed in place on the display 10 of the display device while the target indicator 24 moves around the basic image 12. In such a fixed loupe cursor, the area of the basic image 12 defined by the target indicator 24 is shown in the fixed loupe cursor 20. In this case, the fixed loupe cursor functions as a view window and the target indicator 24 functions as a mobile cursor.

When the loupe cursor 20 is mobile, it may be practical to provide the target indicator 24 at a fixed location relative to the loupe cursor 20, and navigate both together around the basic image 12.

Figure 3:
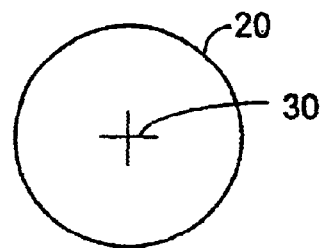
FIG. 3 is diagram showing an example of crosshair of the loupe cursor.

FIG. 3 shows an example of the target indicator 24. In this example, the target indicator is a crosshair 30 positioned at the centre of the loupe cursor 20. The crosshair 30 may be provided by using a windows icon. The crosshair 30 is drawn and redrawn in the icon as the position of the loupe cursor 20 is moved by the user. The crosshair 30 may be provided by using Microsoft Windows Graphical Device Interface (GDI) calls.

Figure 4:
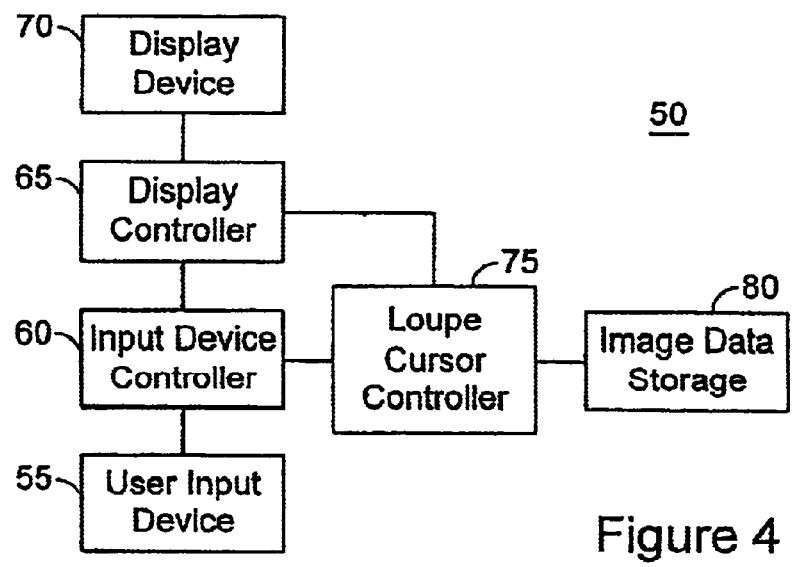
FIG. 4 is a block diagram showing an image editing system in accordance with an embodiment of the present invention.

FIG. 4 shows an image editing system 50 having a loupe cursor in accordance with an embodiment of the present invention.

The image editing system 50 has a user input device 55, a user input device controller 60, a display controller 65 and a display device 70.

The system 50 may use any suitable user input device 55, such as a mouse, keyboard, intellimouse wheel or any combination of different types of input devices.

The user input device controller 60 receives inputs from the user through the user input device 55, and outputs user input signals based on the user's inputs in view of the display, e.g., a position of a mouse cursor on the display. For example, when the user manipulates the user input device 55 to select an area to be magnified, the input device controller 60 generates a user select signal. When the user manipulates the user input device 55 to edit the image on the display device 70, the input device controller 60 generates a user editing signal.

The display controller 65 controls the image displayed on the display device 70 in response to the output of the user input device controller 60.

In accordance with the present invention, the image editing system 50 is also provided with a loupe cursor controller 75 and an image data storage 80. The loupe cursor controller 75 receives the output of user input device controller 60, and outputs loupe image data to the display controller 65 to dynamically display the magnified image in the loupe cursor on the display device 70.

The image data storage 80 is provided for storing image data of the base image. It may also store magnified image data.

Figure 5:
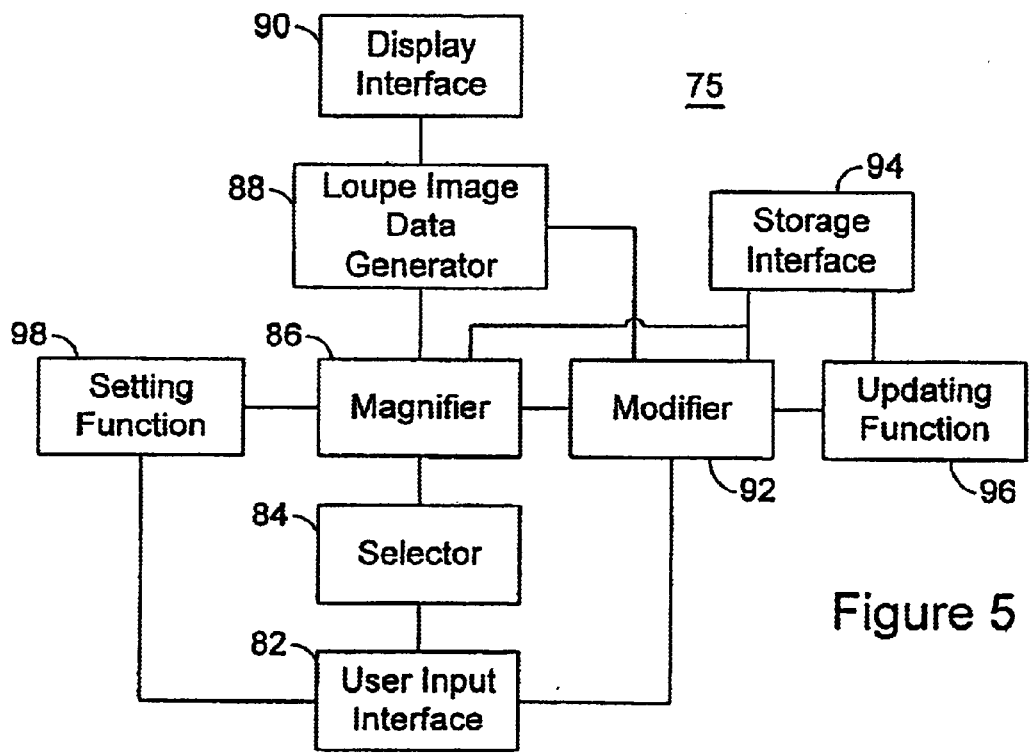
FIG. 5 is a block diagram showing an example of the loupe cursor controller shown in FIG. 4.

FIG. 5 shows an example of the loupe cursor controller 75 shown in FIG. 4.

In this example, the loupe cursor controller 75 comprises a user input interface 82, a selector 84, a magnifier 86, a loupe image data generator 88, a display interface 90 and a modifier 92.

The user input interface 82 is coupled to the user input device controller 60 shown in FIG. 4. It receives user input signals, including a user select signal and a user editing signal. The user select signal defines a selected area of the basic image to be magnified. The selector 84 generates selected basic image data representing the selected area of the basic image.

The magnifier 86 magnifies the selected basic image data and generates magnified image data. The modifier 92 modifies the magnified image data in response to the user editing signal, and generates modified image data.

The loupe image data generator 88 generates loupe image data based on the magnified image data and the modified image data. The display interface 90 sends the loupe image data to the display controller 65 (FIG. 4) to display a loupe image in the loupe cursor based on the loupe image data over the basic image.

The loupe cursor controller 75 may also have a storage interface 94. The storage interface 94 is coupled to the image data storage 80 (FIG. 4) for storing and retrieving image data.

The loupe cursor controller 75 may also have an updating function 96 for updating the image data stored in the image data storage 80 based on the output of the modifier 92.

The loupe cursor controller 75 may also have a setting function 98 for setting magnifying factors of the loupe cursor based on user setting signals received through the user input interface 82.

Figure 6:
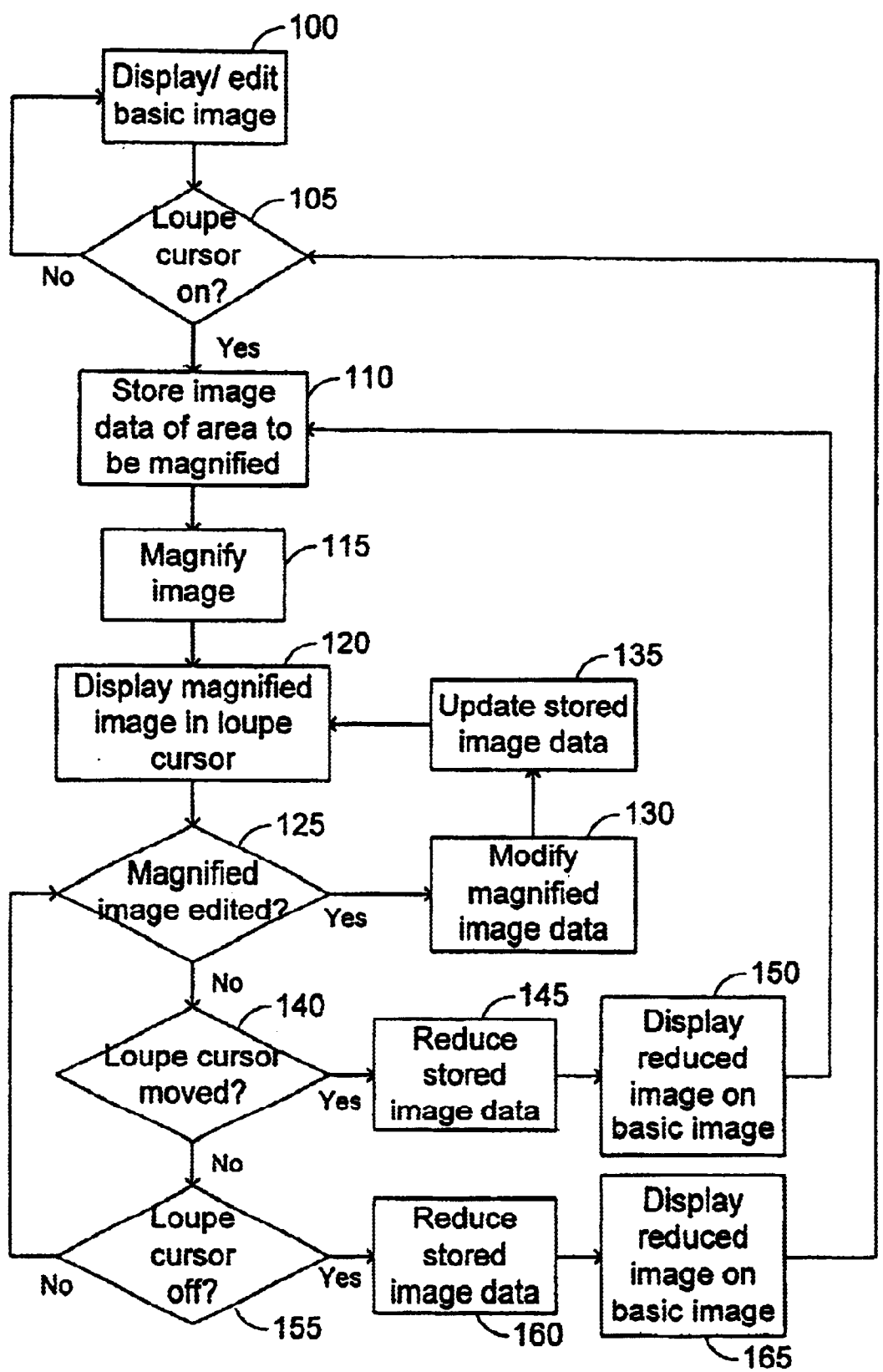
FIG. 6 is a flowchart showing an example of operation of the image editing system shown in FIG. 4.

FIG. 6 shows an example of operation of the image editing system 50 shown in FIG. 4.

The image editing system 50 displays a basic image on the display device 70 and allows users to edit it, as in conventional image editing systems (100).

When a user takes a specific action, a loupe cursor is turned on (105). For example, the user may use a short-cut key "L" to invoke the loupe cursor.

In response to the user's invoking the loupe cursor, the loupe cursor controller 75 stores in the image data storage 80 data of the image of an area of the base image as selected by the target pixel and the magnifying factors of the loupe cursor (110). The selected area will be magnified. The magnifying factors may be preset by the user or provided by the system.

The loupe cursor controller 75 applies the magnification to the image data of the selected area (115). The image data of the selected area maybe retrieved from the image data storage 80 or received from the display controller 65. Then, the loupe cursor controller 75 generates magnified image data and sends it to the display controller 65 to display it within the loupe cursor on the display device 70 (120).

Figure 7:
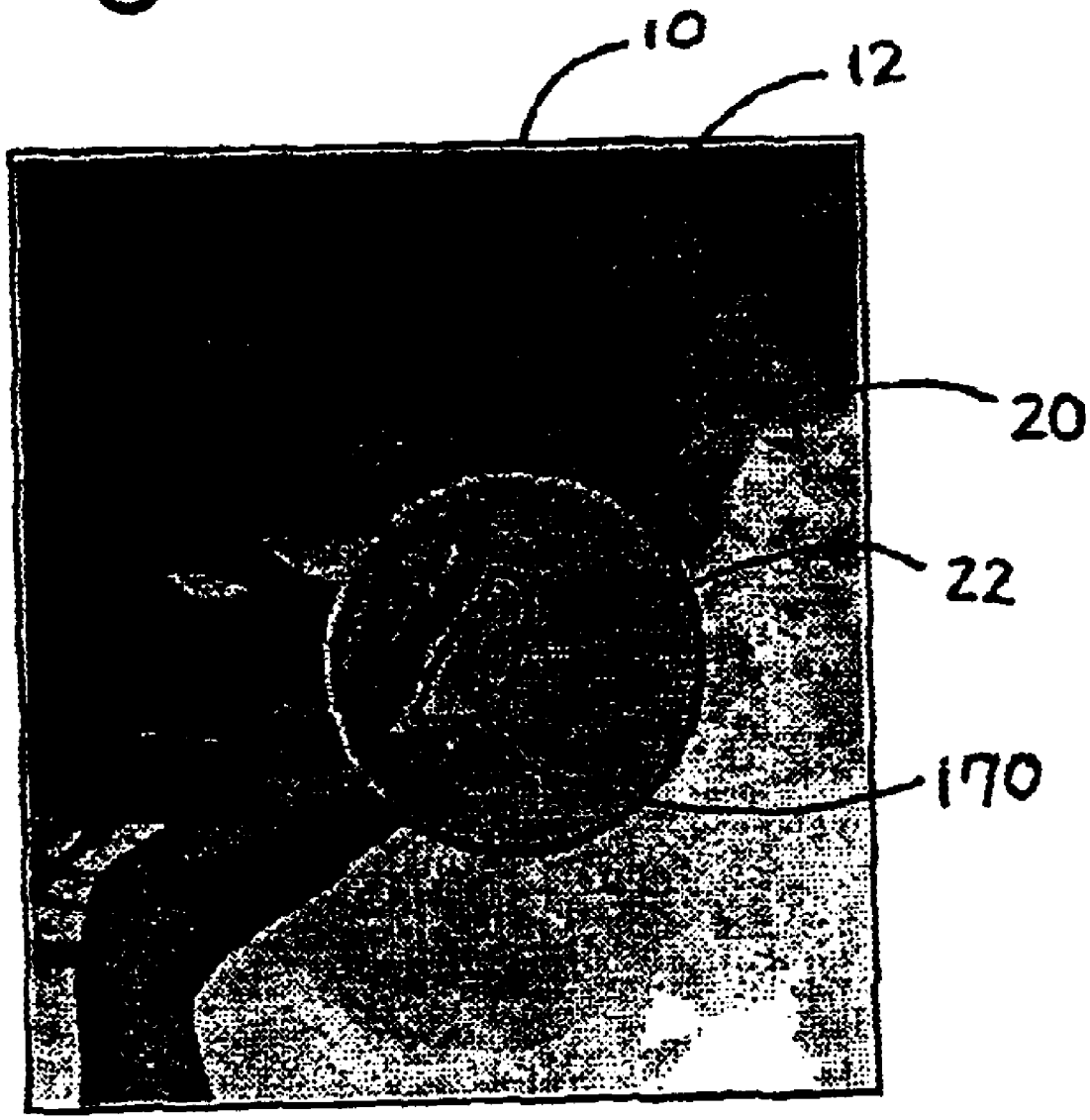
FIG. 7 is a diagram showing an example of editing of an image in the loupe cursor.

The user may edit the magnified image within the loupe cursor (125). To edit the magnified image, the user may use the user input device 55 which sends an editing signal to the loupe cursor controller 75 via the user input device controller 60. For example, a mask 170 may be created by the loupe cursor 20 and displayed wholly within the loupe cursor 20 itself, as shown in FIG. 7.

In response to the editing signal, the loupe cursor controller 75 modifies the magnified image data according to the editing signal (130) and generates modified image data. The modified image data is sent to the display controller 65 to display the modified magnified image in the loupe cursor (120). Thus, the loupe cursor provides continuous display refreshing and allows the user to dynamically edit the magnified image.

The loupe cursor controller 75 may update the image data stored in the image data storage 80 each time the modification image data is generated (135). It may reduce the modified magnified image to the original magnification, and updates the stored image data of the basic image.

When the user moves the loupe cursor or the target indicator (140), the loupe cursor controller 75 reduces the image data stored in the image data storage 80 to the original magnification (145) and displays the reduced image in the selected area of the basic image to which the loupe cursor was acted (150). Thus, the magnified area of the basic image is returned to the basic image together with any editing made to the area. At a new target position, the loupe cursor controller 75 repeats the processes from box 110. Thus, when the loupe cursor or the target indicator is moved, the image visible within the loupe cursor is refreshed.

When the loupe cursor is turned off (155), the loupe cursor controller 75 reduces the image data stored in the image data storage 80 to the original magnification (160) and displays the reduced image in the selected area of the basic image to which the loupe cursor was acted (165).

In the above embodiment, the loupe cursor controller 75 updates the image data of the basic image stored each time the modification is made to the magnified image (135). However, the loupe cursor controller 75 may store the magnified image data in the image data storage 80 separately from the image data of the basic image, and update the magnified image data each time modified image data is generated or when the loupe cursor or the target indicator is moved (140) or turned off (155). In this case, the stored image of the basic image may be updated when the loupe cursor or the target indicator is moved (140) or turned off (155) before it is returned to the selected area of the base image.

The loupe cursor controller 75 may allow the user to change the magnification while a magnified image is displayed in the loupe cursor. When the user indicates zoom-in or zoom-out of the loupe image using the user input device 55, a zoom-in or zoom-out signal is sent to the loupe cursor controller 75 via the user input device controller 60. In response to the zoom-in or zoom-out signal, the loupe cursor controller 75 magnifies or reduces the loupe image in a similar manner to that shown in box 115. It may use the image data stored in the image data storage 80. The system may use a right click and left click of a mouse to zoom-in or zoom-out the image. These mouse clicks may be combined with a special key, e.g., a control key.

The magnified image visible within the loupe cursor may be copied to a clipboard of the image editing system 50. This is done by the loupe cursor controller 75 by storing the magnified image data in a clipboard memory (not shown).

When the loupe cursor is in a fixed position mode, it may also be used to reduce a basic image within the loupe cursor. For example, when the basic image is enlarged so that it cannot be entirely displayed on the users monitor, the loupe cursor may display a reduced basic image so that the basic image is displayed in its entirety within the loupe cursor.

The present invention may be implemented using any suitable software, hardware or any combination thereof. For example, the loupe cursor controller 75 may be implemented using Graphical Device Interface (GDI) calls to magnify a selected area of the basic image and display it inside the loupe cursor. The GDI is the graphical system that manages what appears on the screen. Using appropriate GDI calls, the selected area may be magnified and the image may be edited within the loupe cursor.

The software implementing embodiments of the present invention comprises computer executable code. It may be stored or carried by a medium.

The medium may be a computer readable memory, a signal transmitting medium, a transmittable signal and any other form of medium that can carry the computer executable code. The transmittable signal includes a signal carrying the computer executable code directly or indirectly on a carrier signal.

While particular embodiments of the present invention have been shown and described, changes and modifications may be made to such embodiments without departing from the true scope of the invention.

What is claimed is:

1. A loupe cursor controller for assisting a user to edit a basic image displayed on a display device; the loupe cursor controller comprising:
 a user input interface for receiving a user select signal and a user editing signal;
 a selector for generating selected basic image data representing an area of the basic image defined by the user select signal;
 a magnifier for generating magnified image data by magnifying the selected basic image data;
 a modifier for generating modified image data by modifying the magnified image data in response to the user editing signal;
 a loupe image data generator for generating loupe image data based on the magnified image data and the modified image data, and
 a display interface for sending the loupe image data to the display device to display over the area of the basic image a loupe image based on the loupe image data.

2. The loupe cursor controller as claimed in claim 1 further comprising a storage interface coupled to an image data storage for storing and retrieving the selected basic image data.

3. The loupe cursor controller as claimed in claim 2 further comprising an image data updating function for updating the selected basic image data stored in the image data storage based on the modified image data.

4. The loupe cursor controller as claimed in claim 1, wherein the user input interface receives a user setting signal, and the loupe cursor controller further comprises a setting function for setting a magnifying factor based on the user setting signal.

5. The loupe cursor controller as claimed in claim 4, wherein the magnifier generates magnified image data by multiplying the selected basic image data by the magnifying factor.

6. An image editing system for assisting a user to edit a basic image; the image editing system comprising:
 a user input device for receiving inputs by a user;
 a user input device controller for generating a user select signal and a user editing signal in response to the inputs by the user;
 a display device for displaying the basic image;
 a display controller for controlling the display device;
 a loupe cursor controller having:
  a user input interface for receiving the user select signal and the user editing signal from the user input device controller;
  a selector for generating selected basic image data representing an area of the basic image defined by the user select signal;
  a magnifier for generating magnified image data by magnifying the selected basic image data;
  a modifier for generating modified image data by modifying the magnified image data in response to the user editing signal;
  a loupe image data generator for generating loupe image data based on the magnified image data and the modified image data, and
  a display interface for sending the loupe image data to the display controller to display over the area of the basic image a loupe image based on the loupe image data over the basic image.

7. The image editing system as claimed in claim 6 further comprising an image data storage for storing the selected basic image data.

8. The loupe cursor controller as claimed in claim 7, wherein the loupe cursor controller further comprises an image data updating function for updating the selected basic image data stored in the image data storage based on the modified image data.

9. A user interface for assisting a user to edit a basic image displayed on a display device, the user interface comprising:
 a loupe cursor provided on the basic image, the loupe cursor having a predetermined area on the display, and dynamically displaying over the selected area of the basic image within the predetermined area a loupe image of a selected area of the basic image; and
 an editing tool for editing the loupe image displayed within the loupe cursor.

10. The user interface as claimed in claim 9 wherein the loupe cursor is movable on the basic image.

11. The user interface as claimed in claim 10, wherein the loupe cursor displays the loupe image of an area of the basic image underlying the loupe cursor.

12. The user interface as claimed in claim 10, wherein the loupe cursor is fixed at a location on the basic image.

13. The user interface as claimed in claim 9, wherein the loupe cursor has a target indicator for indicating a target pixel on the basic image upon which the loupe cursor is applied.

14. The user interface as claimed in claim 13, wherein
 the loupe cursor is fixed at a location on the basic image;
 the target indicator is movable on the basic image; and
 the loupe cursor displays a loupe image of an area of the basic image defined by the target indicator.

15. The user interface as claimed in claim 9, wherein the editing tool includes a pointer cursor movable on the basic image and within the area of the loupe lense cursor.

16. The user interface as claimed in claim 9, wherein the user interface presents options of magnifying factors of the loupe cursor.

17. A method for editing a basic image displayed on a display device, the method comprising:
 generating basic image data representing a selected area of the basic image using a loupe cursor having a predetermined area on the display device;
 generating magnified image data by magnifying the selected basic image data;
 displaying within the loupe cursor a loupe image based on the magnified image data;
 receiving a user editing signal for editing the loupe image;
 generating modified image data when the user editing signal is received; and
 dynamically modifying the loupe image displayed within the loupe cursor based on the modified image data wherein said loupe image is displayed over the selected area of the basic image.

18. The method as claimed in claim 17 further comprising storing the selected basic image data in an image data storage.

19. The method as claimed in claim 18 further comprising updating the selected basic image data stored in the image data storage based on the modified image data.

20. The method as claimed in claim 19 further comprising:
   detecting turning off of the loupe cursor on the basic image;
   reducing the updated image data stored in the image data storage to magnification of the basic image; and
   displaying the reduced image data on the selected area of the basic image.

21. The method as claimed in claim 19 further comprising:
   detecting movement of the loupe cursor on the basic image;
   reducing the updated image data stored in the image data storage to magnification of the basic image;
   displaying the reduced image data on the selected area of the basic image;
   generating basic image data representing a selected area of the basic image at a new location of the loupe cursor.

22. The method as claimed in claim 17 further comprising receiving a user setting signal, and setting a magnifying factor of the magnified image based on the user setting signal.

23. The method as claimed in claim 22, wherein the magnifying of the selected basic image data is carried out by multiplying the selected basic image data by the magnifying factor.

24. The method as claimed in claim 17, wherein the basic image data is generated from an area of the basic image underlying the loupe cursor.

25. The method as claimed in claim 17 further comprising:
   fixing the loupe cursor at a location on the basic image;
   moving a target indicator for indicating a target pixel on the basic image upon which the loupe cursor is applied; and
   generating the selected basic image data from an area of the basic image as defined by the target indicator.

26. The method as claimed in claim 17, wherein the magnified image data is modified using an editing tool includes a pointer cursor movable on the basic image and within the area of the loupe lense cursor.

27. A medium for carrying computer executable code for assisting a user to edit a basic image displayed on a display device, the computer executable code comprising instructions of:
   generating basic image data representing a selected area of the basic image using a loupe cursor having a predetermined area on the display device;
   generating magnified image data by magnifying the selected basic image data;
   displaying within the loupe cursor a loupe image based on the magnified image data;
   generating modified image data when a user editing signal is received; and
   modifying the loupe image displayed within the loupe cursor based on the modified image data wherein the loupe image is positioned over the selected area of the basic image.

28. The medium as claimed in claim 27, wherein the computer executable code further comprising instructions of storing the selected basic image data in an image data storage.

29. The medium as claimed in claim 28, wherein the computer executable code further comprising instructions of updating the selected basic image data stored in the image data storage based on the modified image data.

30. The medium as claimed in claim 29, wherein the computer executable code further comprising instructions of:
   detecting turning off of the loupe cursor on the basic image;
   reducing the updated image data stored in the image data storage to magnification of the basic image; and
   displaying the reduced image data on the selected area of the basic image.

31. The medium as claimed in claim 29, wherein the computer executable code further comprising instructions of:
   detecting movement of the loupe cursor on the basic image;
   reducing the updated image data stored in the image data storage to magnification of the basic image;
   displaying the reduced image data on the selected area of the basic image;
   generating basic image data representing a selected area of the basic image at a new location of the loupe cursor.

* * * * *